US006318856B1

(12) United States Patent
Sansone

(10) Patent No.: US 6,318,856 B1
(45) Date of Patent: Nov. 20, 2001

(54) SYSTEM FOR METERING AND AUDITING THE DOTS OR DROPS OR PULSES PRODUCED BY A DIGITAL COMPUTER

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/458,151

(22) Filed: Dec. 9, 1999

(51) Int. Cl.[7] ................................ B41J 2/01; B41J 21/16; B41L 47/46; G06F 17/00

(52) U.S. Cl. ............................ 347/107; 101/91; 400/279; 364/464.02

(58) Field of Search ................................ 347/107, 10, 11; 101/91; 400/279; 364/464.02; 283/71

(56) References Cited

U.S. PATENT DOCUMENTS

| | | | |
|---|---|---|---|
| 4,121,222 | 10/1978 | Diebold et al. | 347/7 |
| 4,413,264 | 11/1983 | Cruz-Uribe et al. | 347/6 |
| 4,455,562 | 6/1984 | Dolan et al. | 347/130 |
| 4,813,912 * | 3/1989 | Chickneas et al. | 364/464.02 |
| 4,872,027 | 10/1989 | Buskirk et al. | 347/19 |
| 5,049,898 | 9/1991 | Arthur et al. | 347/19 |
| 5,068,806 | 11/1991 | Gatten | 395/113 |
| 5,414,452 | 5/1995 | Accatino et al. | 347/7 |
| 5,513,563 | 5/1996 | Berson | 101/91 |
| 5,524,995 * | 6/1996 | Brookner et al. | 400/596 |
| 5,694,156 | 12/1997 | Hoisington et al. | 347/7 |
| 5,699,257 * | 12/1997 | Emmett et al. | 364/464.18 |
| 5,793,388 | 8/1998 | Martinson et al. | 347/19 |

* cited by examiner

*Primary Examiner*—N. Le
*Assistant Examiner*—Shih-wen Hsieh
(74) *Attorney, Agent, or Firm*—Ronald Reichman; Michael E. Melton

(57) ABSTRACT

A device in a postage meter that uses dot or drop printing to enhance security. Security is achieved by counting the number of signal pulses that are used to produce ink drops or ink dots that are required to produce the entire document or specific regions of the document. The aforementioned may be accomplished by adding a smart module to digital print head modules. The smart module would capture driver pulses from the print head module and interpret the pulses associated with regions of the image. Thus, the smart module would take data from the printer controller that is used to cut off printing when the ink is consumed and relate "set" values to the drops produced during the production of the document or portions of the document, thereby linking the document to the actual volume of ink produced.

23 Claims, 9 Drawing Sheets

SYSTEM FOR METERING AND AUDITING THE DOTS OR DROPS OR PULSES PRODUCED BY A DIGITAL COMPUTER

CROSS REFERENCE TO RELATED APPLICATIONS

Reference is made to commonly assigned copending patent application Ser. No. 09/458,231 filed herewith entitled "A System That Meters the Firings Of a Printer to Audit the Dots or Drops or Pulses Produced by a Digital Printer" in the name of Ronald P. Sansone, and Ser. No. 09/458,237 filed herewith entitled "A System for Metering and Auditing the Dots or Drops or Pulses Produced by a Digital Printer in Printing an Arbitrary Graphic" in the names of Ronald P. Sansone and Judith A. Martin.

FIELD OF THE INVENTION

This invention pertains to digital printing and more particularly to the metering and auditing of the dots or drops produced by a digital printer.

DESCRIPTION OF THE PRIOR ART

Printers that print characters in the form of dots have been utilized in postage meters and other devices. The aforementioned printers form characters and/or graphics from a matrix of dots. Unlike the fully formed character printing methods, the printing elements are organized in rows or columns which print dots. A character in a dot printer is formed sequentially by printing at one time all the selected dots, respectively, in a column or a row. Graphics are made possible by precisely positioning dots on a page.

Printers that print characters and graphics by depositing drops of ink on a medium have been utilized in postage meters and other devices. The aforementioned printers form characters and graphics by selectively firing droplets of ink onto a surface. The ink dries upon its absorption into the substance.

Laser printers print characters and graphics by utilizing a focused laser beam and a rotating mirror to draw an image of the desired page on a photosensitive drum. The laser is pulsed periodically or fired periodically to produce small discharged areas on the photosensitive drum that represent the image. The charged image attracts and holds toner. A piece of paper is rolled against the drum while a charged plate behind the paper attracts the toner away from the drum and onto the paper. Heat and/or pressure is then applied to fuse the toner to the paper.

Dot matrix printers print characters. A dot matrix printer may have a 9 or 24 pin head. The pins impact the paper through a ribbon, creating patterns of dots in the shape of letters and numbers in multiple fonts and type sizes.

Thermal matrix printers have an array of 100–200 pins which are placed in contact with thermally sensitive paper. The pins are pulsed or fired with electrical current heating the pins. The heat produced darkens selective areas of the moving paper.

Printers that print by using dots and drops are commercially available as desk top printers and are often utilized as output devices of personal computers. The wide use of the above printers has made it easier to forge documents. Thus, additional security is needed to determine the authenticity of the printed document. One method that has been proposed for providing security is to print encrypted information in the document and decrypting the information at a later time to authenticate the document. One of the disadvantages of the foregoing is that it may be necessary to use a large amount of space on the document to prevent the encrypted information from being decrypted.

Another method that has been proposed for providing security to documents is to print authenticating text in invisible ink on the document to authenticate the document. A luminescent ink may also be used for similar security purposes. One of the disadvantages of the foregoing is that it may be necessary to use special chemicals or an ultraviolet light source to read the authenticating text.

Another method utilized by the prior art for providing security to documents involved the hiding of some information in the document or the modification of some information in the document. The hidden or modified information may be placed in graphics contained in the document. The hidden or modified information was accurately placed so as not to disturb the information. One of the disadvantages of the above is that it is difficult to read the hidden or modified information.

SUMMARY OF THE INVENTION

This invention overcomes the disadvantages of the prior art by providing a system that makes it more difficult to print fraudulent documents. The apparatus of this invention provides a device for verifiable security in a postage meter or other devices using dot or drop printing. Security is achieved by counting the number of signal pulses that are used to produce ink drops or ink dots that are required to produce the entire document or specific regions of the document. The aforementioned may be accomplished by adding a smart module to digital print head modules. The smart module would capture driver pulses from the print head module and interpret the pulses associated with regions of the image. Thus, the smart module would take data from the printer controller that is used to cut off printing when the ink is consumed and relate "set" values to the drops produced during the production of the document or portions of the document, thereby linking the document to the actual volume of ink produced.

DETAILED DESCRIPTION OF THE PREFERRED EMBODIMENT

Figure 1:
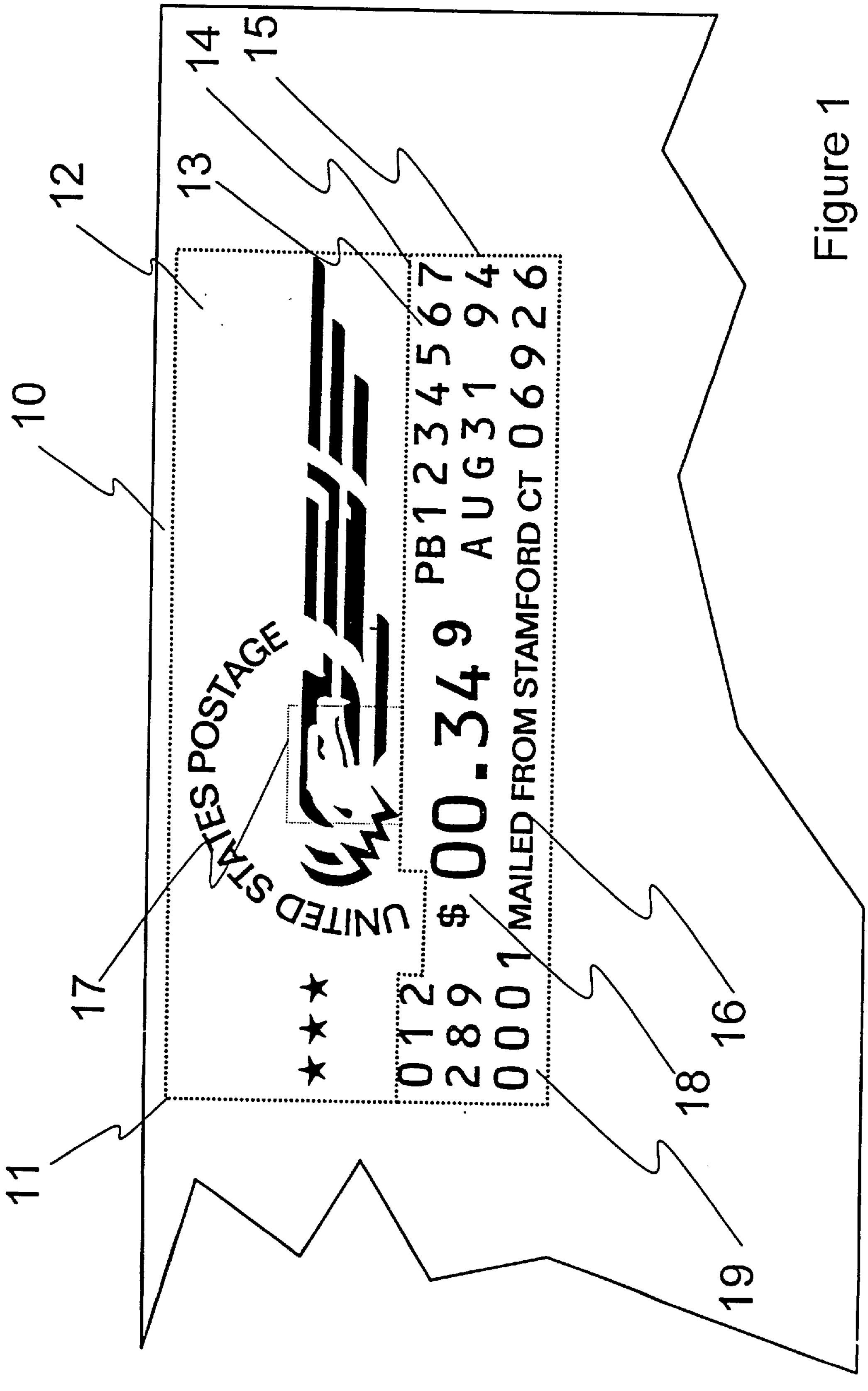
FIG. 1 is a drawing of a postal indicia affixed to a mail piece.

Referring now to the drawings in detail, and more particularly to FIG. 1, the reference character 10 represents a mail piece that has a postal indicia 11 affixed thereto. Indicia 11 has a graphics region 12 and a fixed and variable text region 13. Region 12 includes a region 17 that is printed with 480 pixels.

Region 13 contains a postal meter serial number 14, the date 15, the place the mail piece was mailed from 16, a dollar amount 18, and a security code 19. Indicia 11 may be printed with an ink jet printer, laser printer or thermal printer (not shown). Indicia 11 may be produced by an electronic postage meter.

Figure 2:
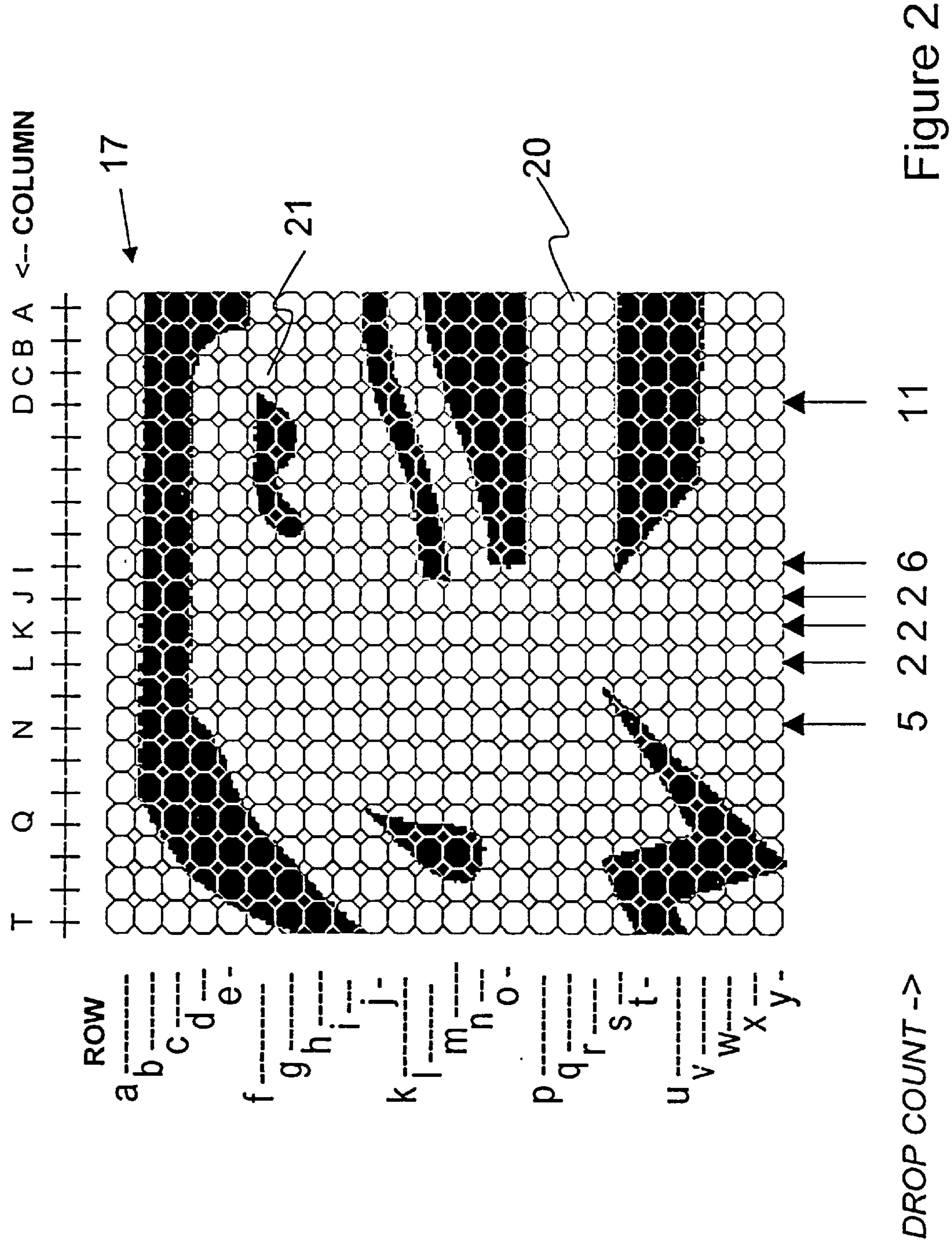
FIG. 2 is a drawing in greater detail of region 17 of indicia 11 of FIG. 1.

FIG. 2 is a drawing in greater detail of portion 17 of indicia 11 of FIG. 1. Region 17 contains 480 pixels or individual identifiable picture elements 20. Pixels 20 are located at specific spatial coordinates. Upper case coordinates are located along the top edge of region 17 to indicate columns and lower case coordinates are located along a side edge of region 17 to indicate rows. Pixel 21 is located at coordinates (C, f). An ink jet printer may deposit a drop of ink in one or more pixels 20 to produce a picture. One ink jet pulse or one drop of ink is used for each pixel 20. If 480 drops of ink are placed in region 17, a black rectangle will be formed.

Column D contains 11 drops of ink which were produced by 11 ink jet pulses. The 11 drops of ink are located in coordinates (D, b), (D, c), (D, f), (D, j), (D, k), (D, m), (D, n), (D, o), (D, s), (D, t), and (D, u). Information may be embedded in the columns of region 17. For instance, column D may be said to represent 11 units (one unit for each drop of ink). A constant number may be added to or subtracted from the counted units to scale the values or to make it more difficult to determine the information placed in particular columns. For instance, column D may be said to represent 9 units by subtracting the number 2 from the drops of ink in column D.

Column I contains 6 drops of ink which were produced by 6 ink jet pulses. The 6 drops of ink are located in coordinates (I, b), (I, c), (I, l), (I, n), (I, o) and (I, s). Column I represents 4 units of information, i.e. 6−2=4.

Column J contains 2 drops of ink which were produced by 2 ink jet pulses. The 2 drops of ink are located in coordinates (J, b) and (J, c). Column J represents 0 units of information, i.e. 2−2=0.

Column K contains 2 drops of ink which were produced by 2 ink jet pulses. The 2 drops of ink are located in coordinates (K, b) and (K, c). Column K represents 0 units of information, i.e. 2−2=0.

Column L contains 2 drops of ink which were produced by 2 ink jet pulses. The 2 drops of ink are located in coordinates (L, b) and (L, c). Column L represents 0 units of information, i.e. 2−2=0.

Column N contains 5 drops of ink which were produced by 5 ink jet pulses. The 5 drops of ink are located in coordinates (N, b), (N, c), (N, d), (N, s), (N, t). Column N represents 3 units of information, i.e. 5−2=3.

The amount of postage 18 indicated by indicia 11 of FIG. 1, namely $0.349 is indicated in the columns and rows of region 17 to make it more difficult to produce fraudulent indicia. The tens of dollar value of the amount of postage 18 is indicated by column L, i.e., 0, and the dollar value is indicated by column K, i.e., 0. The tenths of cents value of the amount of postage 18 is indicated by column N, i.e., 3 and the cents value is indicated by column I, i.e., 4. The tenths of cents value of the amount of postage 18 is indicated by column D, i.e., 9. Thus, columns L, K, N, I and D indicate that $00.349 was paid for postage. Additional drops of ink or ink jet pulses will be added to or subtracted from columns L,K,N,I and D to indicate the amount of postage 18 (FIG. 1). The manner in which the foregoing is accomplished is described in the graphical encoding routines 61 of FIG. 4. A thresholding process is typically used for the encoding of information into region 17. Whether or not the value of a particular pixel 20 should be counted is determined by using a value of 1 to 2% from 0 or white. It would be obvious to one skilled in the art that the amount of postage may also be encoded in the rows of region 17.

Figure 3:
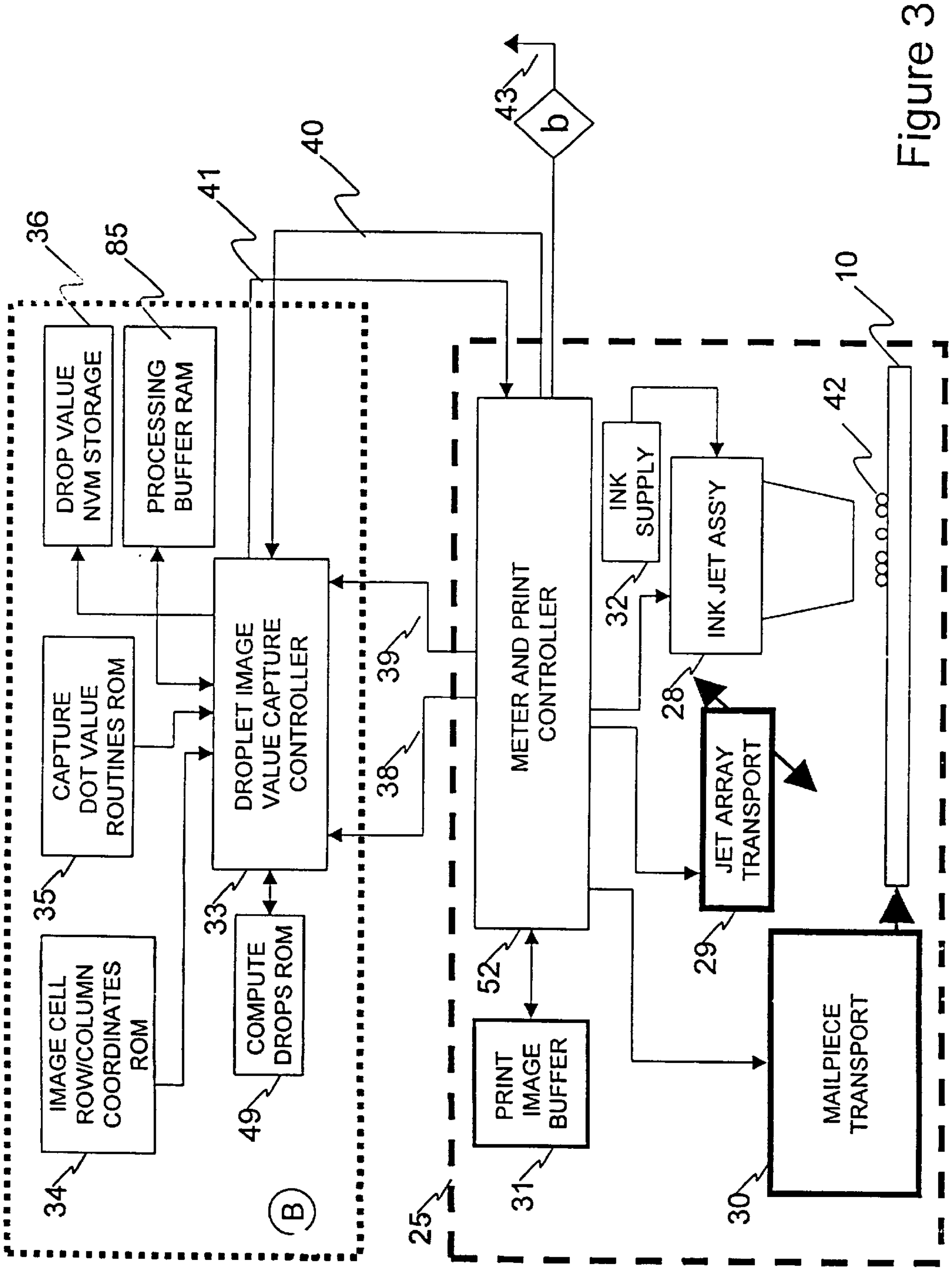
FIG. 3 is a block drawing showing meter controller 52 connected to printer 25 and information capture module 26.

FIG. 3 is a block drawing of meter and printer controller 52 functioning as a printer controller. FIG. 3 shows a print module 25 and an information capture module 26. Print module 25 comprises: a meter and print controller 52; an ink jet assembly 28; an ink jet array transport 29; a mail piece transport 30; a print image buffer 31; and an ink supply 32 that is coupled to ink jet assembly 28. Print controller 52 is coupled to ink jet assembly 28, ink jet array transport 29, mail piece transport 30, print image buffer 31, and ink jet assembly 28. Information capture module 26 comprises: droplet image value capture controller 33; image cell row/column coordinates Read Only Memory 34; capture drop value routines Read Only Memory 35; compute drop Read Only Memory 49; processing buffer Random Access Memory 85, and drop value storage non-volatile memory 36. Processor 33 is coupled to ROM 34, drop value routines ROM 35, drop value non-volatile storage memory 36, ROM 49, process buffer Random Access Memory 85 and meter and print controller 52. It would be obvious to one skilled in the art that either a laser printer or other digital printers may be used instead of ink jet assembly 28 and ink supply 32 to apply postage to an envelope, label or post card.

When one wants to print indicia 11 on mail piece 10 (FIG. 1), one places mail piece 10 in the mail piece transport 30 and sets the correct postage value in electronic meter 50 (FIG. 4), i.e. $0.349. Print image input data will then be transferred from print image buffer 31 to meter and print controller 52. The print image input data will include all of the information that is necessary to print indicia 11. The above information will include the information that is required to print region 17 of indicia 11. Controller 52 will cause mail piece transport 30 to move mail piece 10 under ink jet assembly 28 back and forth and ink jet array transport 29 to move ink jet assembly 28 to deposit ink drops 42 on mail piece 10 to form indicia 11. As the printing process proceeds, controller 52 also provides position data via line 38 and droplet data via line 39 to controller 33. Controller 52 will transmit the position data for region 17 of indicia 11 to droplet image value capture processor 33 via line 38. Controller 52 will transmit the droplet data for region 17 of indicia 11 to droplet image value capture processor 33 via line 39, and controller 52 will provide a data clock signal to processor 33 via line 40. At the appropriate time, controller 33 will obtain the row and column coordinates of region 17 from ROM 34. The routines in ROM 35 are used to capture the number of drops in columns D, I, J, K, L, and N (FIG. 2) and to temporarily store the number of drops in the columns in non-volatile memory 36. Controller 33 utilizes the computational routines in ROM 49 to calculate the postage value represented by the number of drops in columns D, I, J, K, L, and N. Thus, memory 36 will store the dollar amount of postage 18 indicated in indicia 11 (FIG. 1). Controller 33 will transmit the number of drops in columns D, I, J, K, L, and N, and their locations and the number and locations of the other drops in region 17 to controller 52 via line 41.

Figure 4:
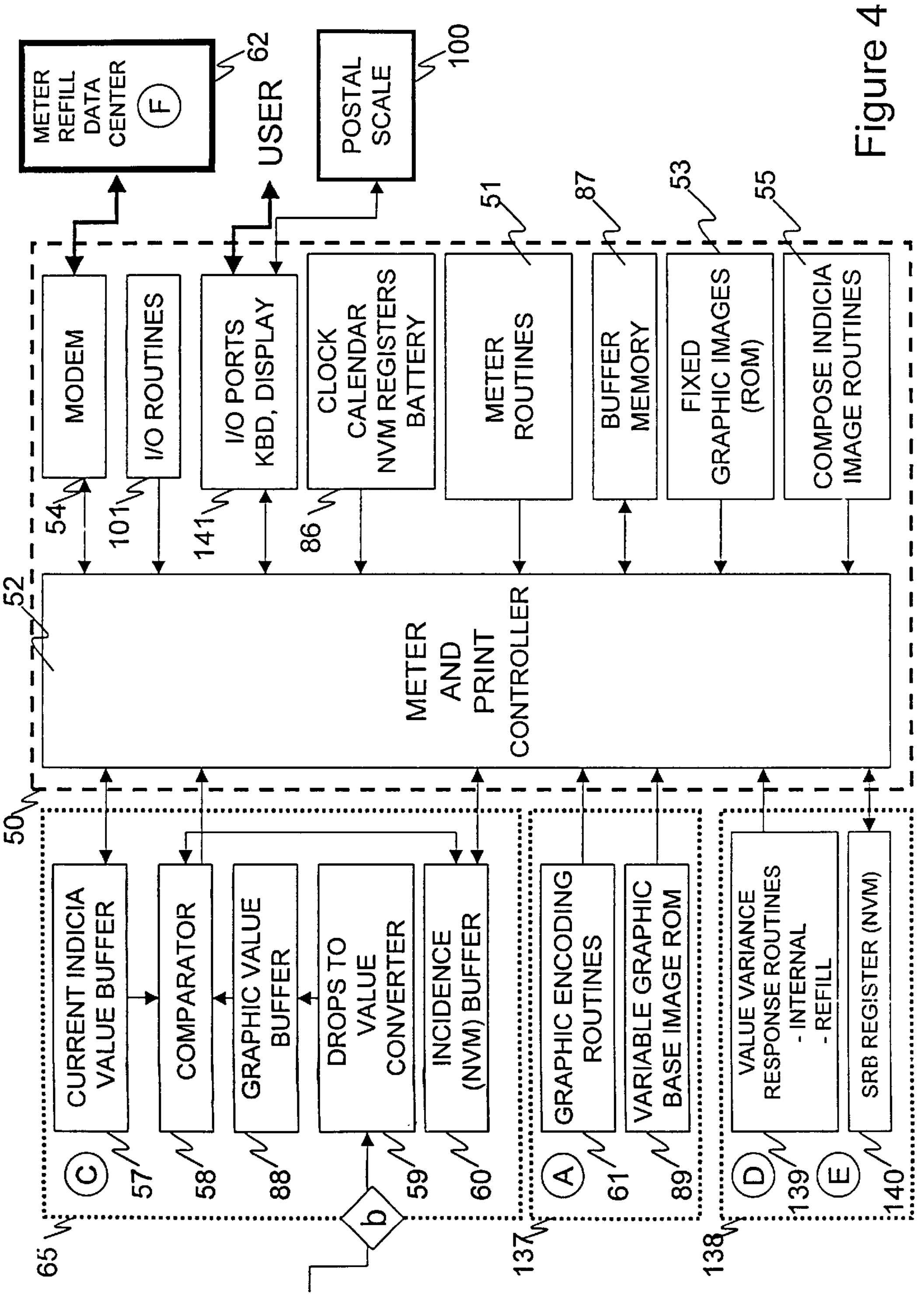
FIG. 4 is a block diagram showing meter and printer controller 52 functioning as a meter controller.

FIG. 4 is a block diagram showing meter and printer controller 52 functioning as a meter controller. Controller 52 will transmit the number of drops in columns D, I, J, K, L, and N and their locations to drops to value converter 59 via line 43. Electronic meter 50 includes meter routines 51, meter and print controller 52, fixed graphic image Read Only Memory 53, modem 54, compose indicia image routines 55, clock calendar non-volatile memory and battery 86, I/O routines 101, I/O ports, keyboard and display 141 and buffer memory 87. Controller 52 is coupled to modem 54, I/O routines 101 and meter routines 51, I/O port keyboard and display 141. A postage verifying module 65 is coupled to electronic meter 50. Module 65 includes: a current indicia value buffer 57 that is coupled to controller 52; a comparator 58 that is coupled to buffer 57 and controller 52, graphic value buffer 88 that is coupled to comparator 58; a drops to value buffer and converter 59 that is coupled to buffer 88; an incident, non-volatile memory buffer 60 that is coupled to comparator 58 and to controller 52; encoding module 137 includes graphic encoding routines 61 and variable graphic base image ROM 89. Graphics encoding routines 61 are coupled to controller 52 and ROM 89 is coupled to controller 52. Modem 54 is coupled to meter refill data center 62. Postal scale 100 is coupled to I/O ports keyboard and display 141.

Meter 50 begins to function when a user sets the postage dollar amount 18 (FIG. 1) by weighing mail piece 10 on scale 100. Alternatively, the user may enter the weight of mail piece 10 into I/O ports, keyboard and display 141 of meter 50. The weight and amount of postage for mail piece 10 is displayed by meter 50. Controller 52 will compose an image of indicia 11 (FIG. 1) using the fixed graphic images from ROM 53 and using encoding routines 61. The above image will be stored in print image buffer 31. Buffer 31 will provide the above image to meter controller 52. Upon completion of region 17 of indicia 11, the drop values stored in non violate memory 36 may be transferred by controller 33 via line 41 to controller 52. Controller 52 will also transfer the above values via line 43 to value converter 59. Process controller 52 detects the drop information deposited in converter 59 and initiates conversion of the drop information to postal value. Controller 52 stores the value produced by converter 59 in buffer 88. The value stored in buffer 88 is compared by comparator 58 to the value stored in buffer 57. A match causes no output. A mismatch causes the difference between the value in buffer 88 and buffer 57 to be stored in buffer 60. When buffers 57 and 88 do not have the same value, there exists the possibility of fraud or a micro processor malfunction. Meter routines 51 will handle the accounting functions of meter 50. Routines 51 are not being described, because one skilled in the art is aware of their operation and function.

Modem 54 communicates with meter data center 62 during a refill of postage meter 50 by exchanging funds and the difference in value between buffers 57 and 88 is stored in buffer 60 so that possible fraud may be investigated.

Figure 5:
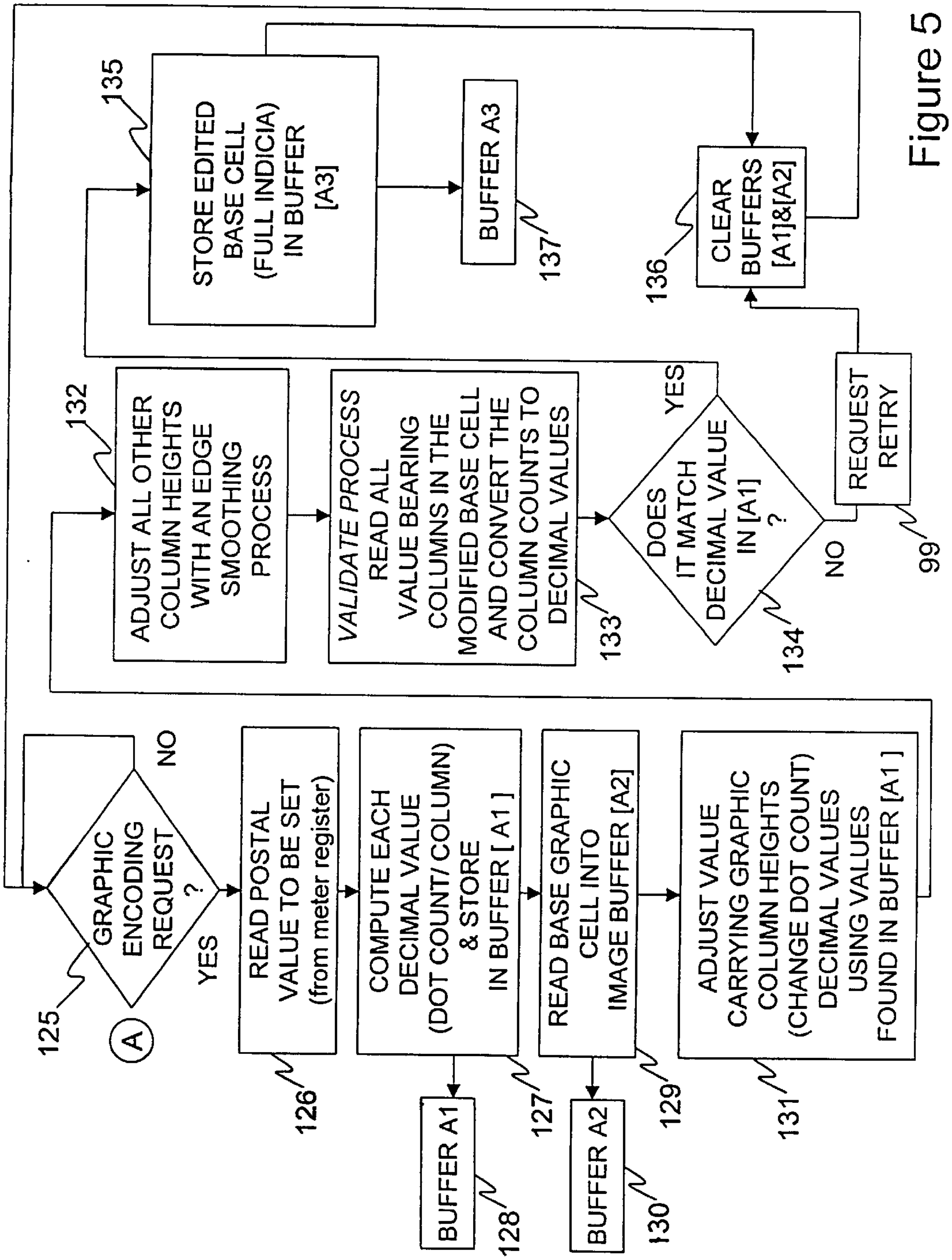
FIG. 5 is a flow chart showing how region 17 is formed.

FIG. 5 is a flow chart showing how region 17 is formed. The program begins in decision block 125. Block 125 determines whether or not a graphic encoding request has been received from meter controller 52. If block 125 determines that a graphic encoding request has not been received, the program goes back to the input of block 125. If block 125 determines that a graphic encoding request has been received, the program goes to the input of block 126. Block 126 reads the amount of postage that was set in meter 50 by the user, i.e., $0.349. Then the program goes to block 127 to compute each decimal value for the number of pixels in columns D, I, J, K, L and N of region 17 (FIG. 2). Now the program goes to block 128 to store the value obtained in block 127 in the buffer of block 128. At this point the program goes to block 129 to read the base graphic cell (the remaining columns of region 17). The base graphic cell is then stored in the buffer in block 130.

At this point, the program goes to block 131 to adjust the value carrying graphic column heights i.e., the heights of columns D, I, J, K, L and N of region 17 (FIG. 2). The aforementioned heights are adjusted by using the values stored in the buffer of block 128 and checking that the number of pixels in columns D, I, J, K, L and N of region 17 (FIG. 2) match the decimal values of the pixels indicated by the buffer of block 128 i.e., $0.349 postage is represented by the pixels of columns D, I, J, K, L and N of region 17. Now the program goes to block 132 to adjust all of the remaining columns of region 17 in order to make the graphic in region 17 pleasing to the human eye. Then the program goes to block 133 to begin the validation process. The validation process will read all the value bearing columns, i.e., columns D, I, J, K, L and N of region 17 in the modified base cell, and convert the column counts to decimal values. Now the program goes to decision block 134. Block 134 determines whether or not the value determined in block 133 matches the decimal value stored in the buffer of block 128. If block 134 determines that the value determined in block 133 does not match the value stored in the buffer of block 128, the program knows that a mistake was made and the program goes to block 99 retry and to block 136. Block 136 will clear the buffers in blocks 128 and 130. Then the program will go back to the input of block 125. If block 134 determines that the value determined in block 133 matches the value stored in the buffer of block 128, the program knows that a mistake was not made, and the program goes to the input of block 135. Block 135 adds the edited base cell (region 17) to the full indicia 11 (regions 12 and 13). The foregoing result is stored in the buffer of block 137. The program also goes to block 136 to clear the buffers in blocks 128 and 130. Then the program will go back to the input of block 125.

Figure 6:
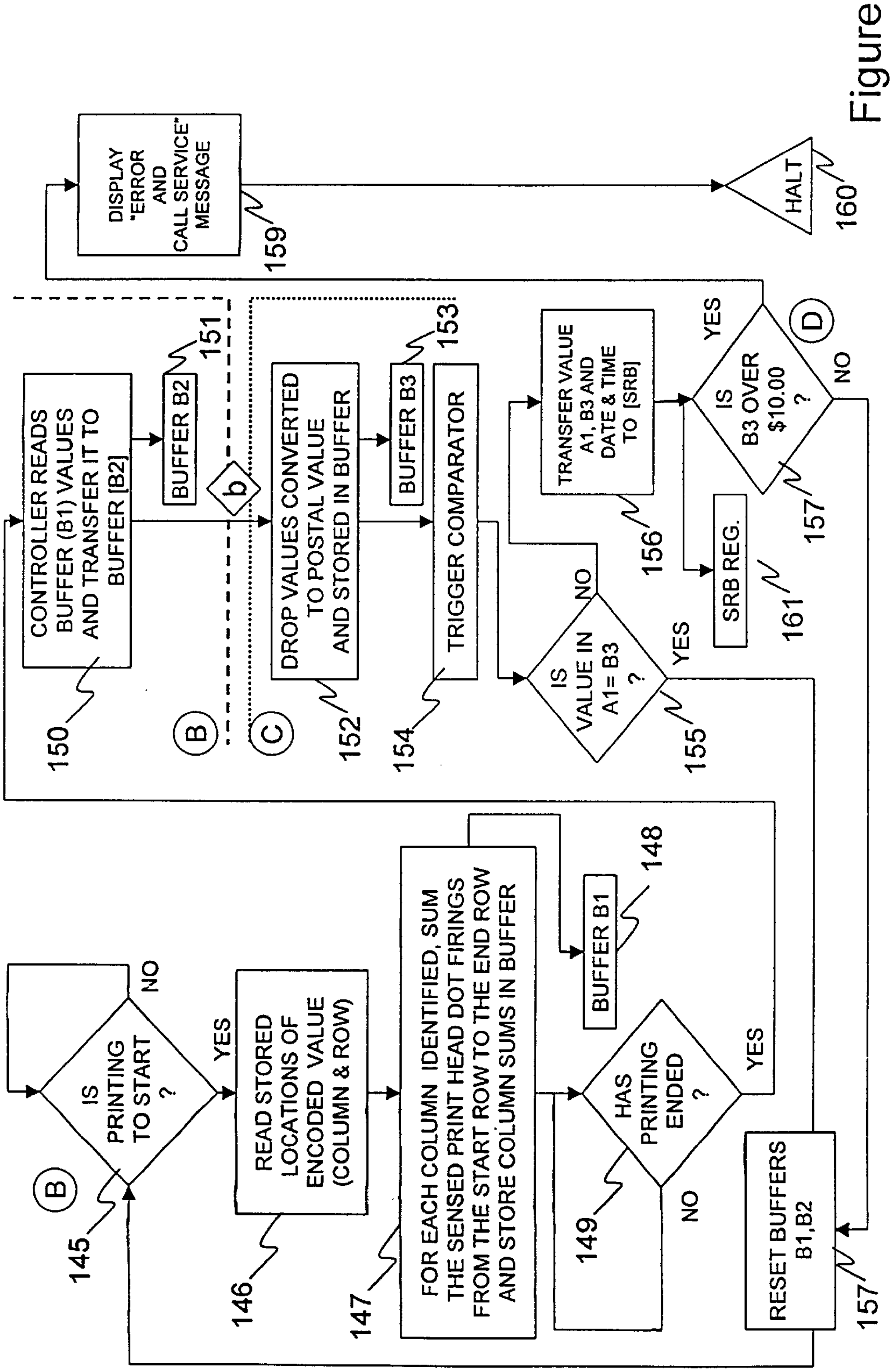
FIG. 6 is a flow chart of the program contained in controller 33; and also of a portion of the program contained in controller 52.

FIG. 6 is a flow chart of the program contained in controller 33 and a portion of the program contained in controller 52. The Input to block 145 is received from controller 62. Decision block 145 determines whether or not the printing that is going to take place (FIG. 5) has begun. If block 145 determines that the printing has not begun, the program goes back to the input of block 145. If block 145 determines that the printing has begun, the program goes to the input of block 146. Block 146 reads the stored locations of the encoded value by column and row. Then the program goes to block 147. For the six identified columns i.e., columns D, I, J, K, L and N of region 17, block 147 sums the sensed print head pixel or drop firings transferred by line 39 (FIG. 3) from the start of a row to the end of a row for each of the six columns. Then block 147 stores the column sum for each of the six columns in the buffer in block 148. Now the program goes to decision block 149. Block 149 determines whether or not the printing has ended. If block 149 determines that the printing has not ended, the program goes back to the input of block 149. If block 149 determines that the printing has ended, the program goes to the input of block 160. In block 150 controller 33 (FIG. 3) reads the values stored in the buffer in block 148 and converts the values to a status message that Is transferred to the drop to value converter 59 (FIG. 4) block 151 (FIG. 7). Then the program goes to block 152 where the drop values are converted to a postal value. The postal value is stored in buffer 88 (FIG. 4) block 153 buffer.

At this point the program goes to block 154. Block 154 triggers comparator 58 (FIG. 4). Then the program goes to decision block 155. Block 155 determines whether or not the value in the buffer in block 128 equals the value in the buffer in block 153. in other words, does the postage set by the user of meter 50 equal the coded value of the postage indicated in columns D, I, J, K, L and N of region 17, i.e.: does the value in buffer 57 equal the value in buffer 88? If block 155 determines that the value of the buffer in block 128 equals the value of the buffer in block 153, the program goes to block 157 to reset the buffers in blocks 148, 151, and 153. Then the program goes back to the input of block 145. If block 155 determines that the value of the buffer in block 128 does not equal the value of the buffer in block 153, the program goes to block 156.

Block 156 will transfer the value of the buffer in block 128 and the value of the buffer in block 153 and the date and time to the Special Refill buffer in block 161.

Now the program will go to decision block 157. Block 157 will determine whether or not the value stored in the buffer of block 128 differs from the value stored in the buffer of block 153 by an amount greater than $10.00. If block 153 determines that the amount is less than $10.00, the program will go to block 157 to reset buffers 148, 151, and 153. Then the program will go back to the input of block 145. If block 153 determines that the amount is over $10.00, the program goes to block 159 to display the error to display a call service message. Then the program goes to block 160 and halts.

Figure 7A:
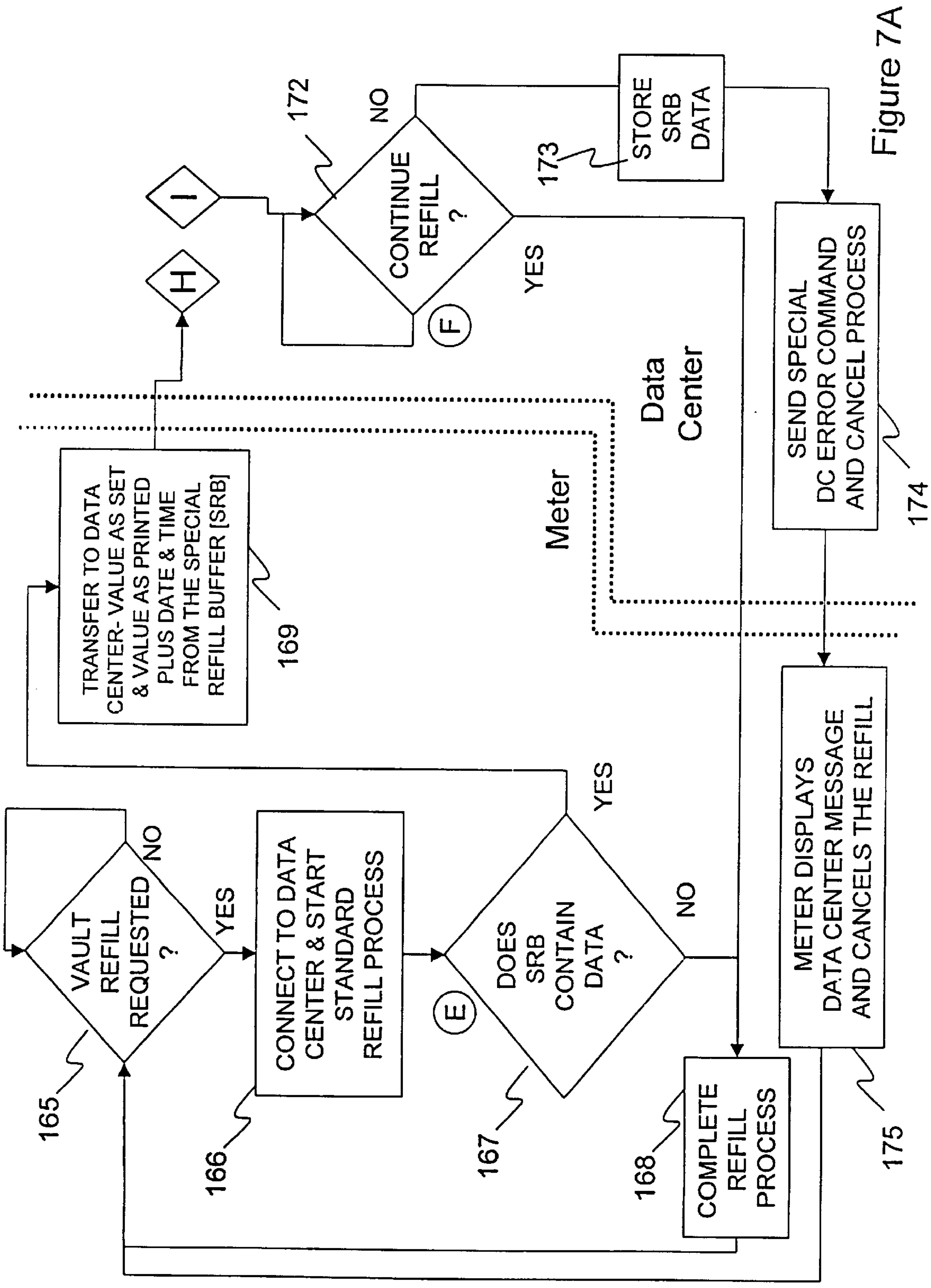
FIGS. 7A and 7B is a flow chart of a portion of the program contained in controller 52 and of the program contained in data center 62.
Figure 7B:
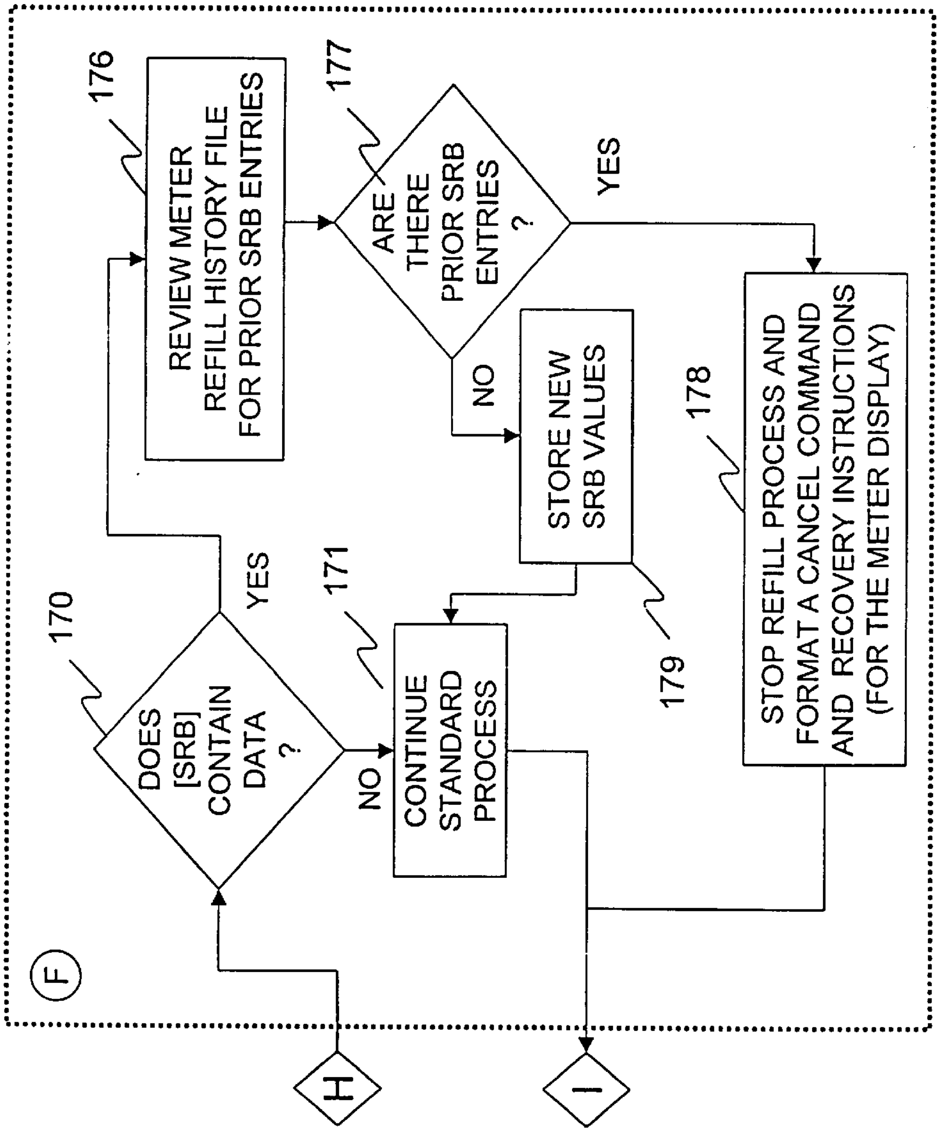

FIGS. 7A and 7B is a flow chart of a portion of the program contained in controller 52 and the program contained in data center 62. The input to block 165 comes from meter controller 52. Decision block 165 determines whether or not the user of meter 50 has requested that additional funds be added to the vault (not shown) of meter 50. If block 165 determines that no additional funds have been requested by the user of meter 50, the program goes back to the input of block 165. If block 165 determines that the user of meter 50 has requested that additional funds be added to the vault, the program goes to block 166. Block 166 connects meter 50 to data center 62 and starts the standard meter refill process (which is well-known in the art).

At this point, the program goes to decision block 167. Block 167 determines whether or not the special refill buffer in block 161 contains any data. If block 167 determines that the buffer in block 161 does not contain any data, the program goes to block 168 to complete the meter refill process. Then the program goes back to the input of block 165. If block 167 determines that the buffer in block 161 contains data, the program goes to block 169 to transfer to data center 62 the postage value as set by the user and the postage value as printed on mail piece 10, i.e.: $0.349 plus the date and time from the special refill buffer in block 161.

Then the program goes to the input of decision block 170 (FIG. 7B). Block 170 determines whether or not the special refill buffer in block 161 contains data. If block 170 determines that the buffer (not shown) in data center 62 does not contain data, the program goes to block 171 to continue the standard meter refill process. Now the program goes to the input of decision block 172 (FIG. 7A). Block 172 determines whether or not to continue the standard meter refill process. If block 172 determines to continue the refill process, the program goes to block 168 to continue the refill process. Then the program goes back to the input of block 165.

If decision block 170 (FIG. 7B) determines that the special refill buffer in block 161 contains data, the program goes to block 176 to review the meter refill history file for prior special refill buffer entries. Then the program goes to decision block 177. Block 177 determines whether or not there are any prior special refill buffer entries in block 161. If block 177 determines that there were prior entries in block 161, the program goes to block 178 to stop the meter refill process and format a cancel command and recovery instructions for the display of meter 50 (FIG. 4). Then the program goes back to the input of decision block 172 (FIG. 7A).

If block 172 determines not to continue the meter refill process, the program goes to block 173 to store the special refill buffer data in the buffer in data center 62 (not shown). At this point, the program goes to block 174 to transfer a special data center 62 (FIG. 4) error command and cancel the meter refill process. Then the program goes to block 175 to display the data center 62 error message on the display of meter 50 notifying the user of the cancellation of the refill process.

If block 177 determines that there are no prior special refill buffer entries in block 161, the program will go to block 179 to store the new special refill buffer entries. Then the program will go to block 171.

Figure 8:
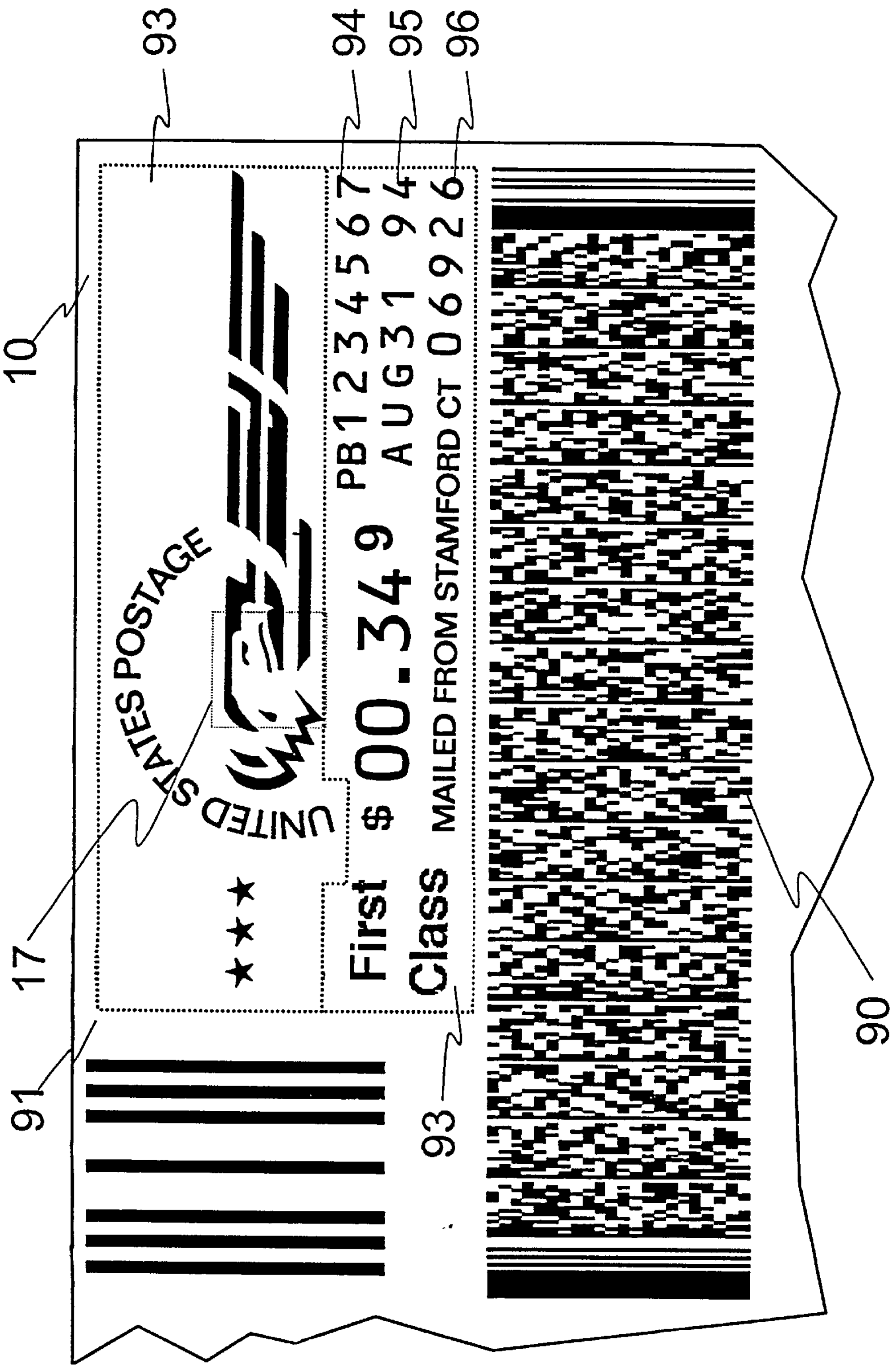
FIG. 8 is a drawing of an Information Based Indicia affixed to a mail piece.

FIG. 8 is a drawing of an Information Based Indicia affixed to mail piece 10. Indicia 91 has a graphic region 92, a fixed and variable text region 93 and a two dimensional bar code 90. Region 92 includes a region 17 that is printed with 480 pixels. Region 93 contains a postal meter serial number 94, the date 95, the place the mail piece was mailed from 96, and a dollar amount 98.

Indicia 91 may be produced by a personal computer, a printer combined with either a postal security device attached to the personal computer (personal computer postage meter) or a postal security device coupled to a personal computer via a data center and a printer (virtual postage meter).

The above specification describes a new and improved apparatus for providing security to documents by metering and auditing the number of dots or drops used to produce the document or regions of the document. It is realized that the above description may indicate to those skilled in the art additional ways in which the principals of this invention may be used without departing from the spirit. It is, therefore, intended that this invention be limited only by the scope of the appended claims.

What is claimed is:

1. A postage meter that produces a postal indicia, said postal indicia comprises:

a text region that indicates postage that has been paid;

a graphic region that has at least one graphic containing a plurality of pixels, wherein the plurality of pixels form a code that indicates the amount of postage that has been paid, wherein the pixels that comprise the graphic are arranged in columns and rows, and the amount of postage paid is coded by the pixels in the columns, wherein a portion of one of the columns is coded by the pixels to indicate tens of dollars of postage paid;

a portion of one of the columns is coded by the pixels to indicate dollars of postage paid;

a portion of one of the columns is coded by the pixels to indicate tens of cents of postage paid;

a portion of one of the columns is coded by the pixels to indicate the number of cents of postage paid; and a portion of one of the columns is coded by the pixels to indicate tenths of cents of postage paid, wherein the meter includes a printer that produces one or more pulses for each pixel printed, wherein the meter includes a counter that respectively counts:

the number of pulses produced to form the coded tens of dollars of postage;

the number of pulses produced to form the coded dollars of postage;

the number of pulses produced to form the coded tens of cents of postage;

the number of pulses produced to form the coded cents of postage; and the number of pulses produced to form the coded tenths of cents of postage.

2. The meter claimed in claim 1, wherein the meter includes a vault that stores the amount of postage paid, and a comparator that compares the amount of postage paid with the amount of postage paid indicated by the coded pixels.

3. The meter claimed in claim 2, further including:

a memory that stores a cumulative differences in postage indicated by the comparator.

4. The meter claimed in claim 3, further including:

a locking mechanism that prevents the meter from printing additional indicia when the cumulative differences in postage reach a specified value.

5. The meter claimed in claim 3, wherein the meter uploads the differences in postage stored in the memory to a data center during a meter refill.

6. The meter claimed in claim 5, wherein the data center includes means for notifying the postal authorities when the cumulative differences in postage reach a specified value.

7. The meter claimed in claim 1, wherein the meter includes a printer that produces one or more printing ink jet pulses for each pixel printed by a drop of ink.

8. The meter claimed in claim 1, wherein the meter includes a counter that respectively counts: the number of printing pulses produced to form the coded tens of dollars of postage; the number of printing pulses produced to form the coded dollars of postage; the number of printing pulses produced to form the coded tens of cents of postage; the number of printing pulses produced to form the coded cents of postage; and the number of printing pulses produced to form the coded tenths of cents of postage.

9. The meter claimed in claim 1, wherein the meter includes a vault that stores the amount of postage paid, and a comparator that compares the amount of postage paid with the amount of postage paid indicated by the coded pixels.

10. The meter claimed in claim 1, further including:

a memory that stores the cumulative differences in postage indicated by the comparator.

11. The meter claimed in claim 1, further including:

a locking mechanism that prevents the meter from printing additional indicia when the cumulative differences in postage reach a specified value.

12. The meter claimed in claim 1, wherein possible fraud is indicated if the postage indicated by the text region is not the same as the postage indicated by the plurality of pixels that form a code.

13. The meter claimed in claim 1, wherein the meter is an electronic postage meter.

14. The meter claimed in claim 1, wherein the meter is a personal computer and a postal security device.

15. The meter claimed in claim 1, wherein the meter is a virtual meter.

16. A postage meter that produces a postal indicia, said postal indicia comprises:

a text region that indicates postage that has been paid; and a graphic region that has at least one graphic containing a plurality of pixels, wherein the plurality of pixels form a code that indicates the amount of postage that has been paid, wherein the pixels that comprise the graphic are arranged in columns and rows and the amount of postage paid is coded by the pixels in one or more of the rows, a portion of one of the rows is coded by the pixels to indicate tens of dollars of postage paid;

a portion of one of the rows is coded by the pixels to indicate dollars of postage paid;

a portion of one of the rows is coded by the pixels to indicate tens of cents of postage paid;

a portion of one of the rows is coded by the pixels to indicate number of cents of postage paid; and a portion of one of the rows is coded by the pixels to indicate tenths of cents of postage paid, wherein the meter includes a printer that produces one or more pulses for each pixel printed; and wherein the meter includes a counter that respectively counts: the number of pulses produced to form the coded tens of dollars of postage; the number of pulses produced to form the coded dollars of postage; the number of pulses produced to form the coded tens of cents of postage; the number of pulses produced to form the coded cents of postage; and the number of pulses produced to form the coded tenths of cents of postage.

17. The meter claimed in claim 16, wherein the meter includes a vault that stores the amount of postage paid, and a comparator that compares the amount of postage paid with the amount of postage paid indicated by the coded pixels.

18. The meter claimed in claim 16, further including:

a memory that stores the cumulative differences in postage indicated by the comparator.

19. The meter claimed in claim 16, further including:

a locking mechanism that prevents the meter from printing additional indicia when the cumulative differences in postage reach a specified value.

20. The meter claimed in claim 16, wherein possible fraud is indicated if the postage indicated by the text region is not the same as the postage indicated by the plurality of pixels that form a code.

21. The meter claimed in claim 16, wherein the meter is an electronic postage meter.

22. The meter claimed in claim 16, wherein the meter is a personal computer and a postal security device.

23. The meter claimed in claim 16, wherein the meter is a virtual meter.

* * * * *